INVENTOR.
John W. Miller
BY
Munn & Co.
ATTORNEYS

Dec. 1, 1925.

J. W. MILLER

POWER TRANSMISSION MECHANISM

Filed Nov. 6, 1923

INVENTOR.
John W. Miller
BY
Munn & Co.
ATTORNEYS

Patented Dec. 1, 1925.

1,563,514

UNITED STATES PATENT OFFICE.

JOHN W. MILLER, OF PASADENA, CALIFORNIA.

POWER-TRANSMISSION MECHANISM.

Application filed November 6, 1923. Serial No. 673,149.

*To all whom it may concern:*

Be it known that I, JOHN W. MILLER, a citizen of the United States, and a resident of Pasadena, in the county of Los Angeles and State of California, have invented certain new and useful Improvements in Power-Transmission Mechanism, of which the following is a specification.

My invention relates to portable well drilling apparatus, and a purpose of my invention is the provision of an extremely simple, practical and efficient power transmission mechanism particularly adapted, although not necessarily, for use with portable well drilling apparatus, and which is operable to drive all of the mechanisms necessary in spudding in, drilling, casing application, and baling of a well, and in such manner that the arbitrary control of certain of the mechanisms, both as to operation and direction of movement, is effected and independently of the usual jack shaft and motor. By means of my invention the several operations of the drilling of a well can be accomplished in proper succession without the necessity, as in former apparatus, of bringing the prime mover or motor to a standstill with the termination of one operation and the beginning of another.

I will describe only one form of power transmission mechanism embodying my invention, and will then point out the novel features thereof in claims.

Figure 3:
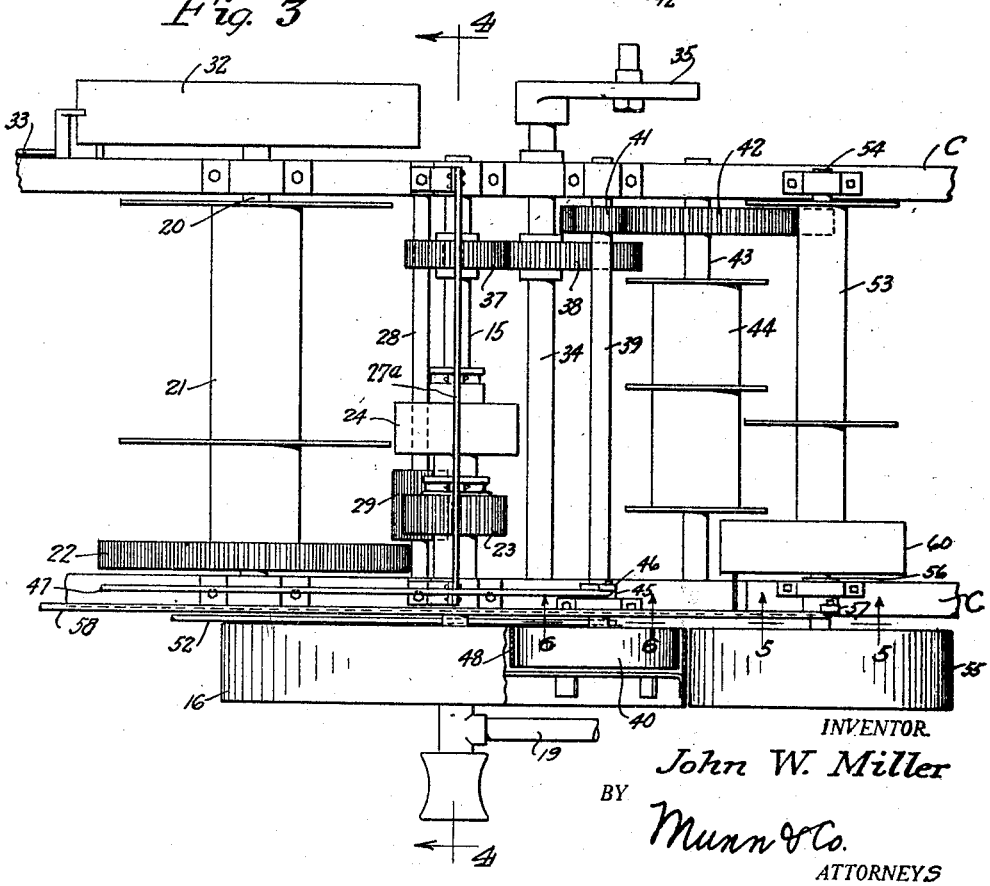
Figure 3 is a view showing in top plan and partly in section the transmission mechanism shown in Figure 2.
Figure 4:
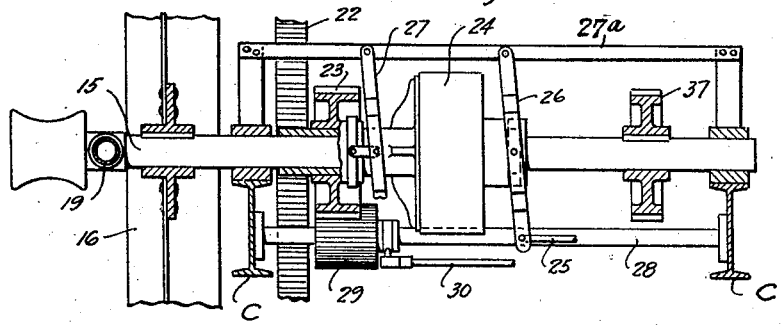
Figure 5:
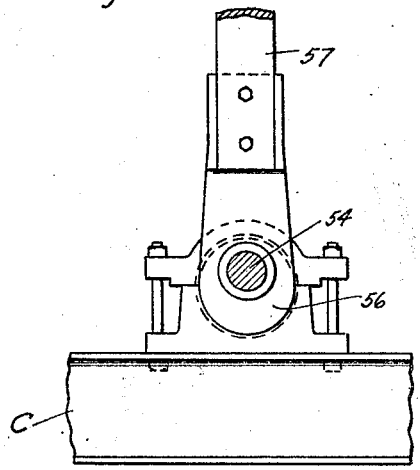
Figure 6:
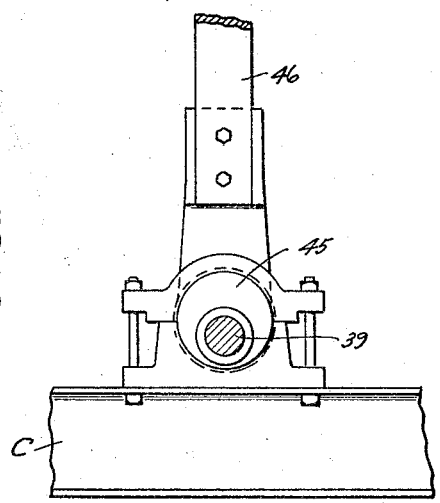

Figures 4, 5 and 6 are sectional views taken on the lines 4—4, 5—5 and 6—6, respectively, of Figure 3.

Similar reference characters refer to similar parts in each of the several views.

Figure 1:
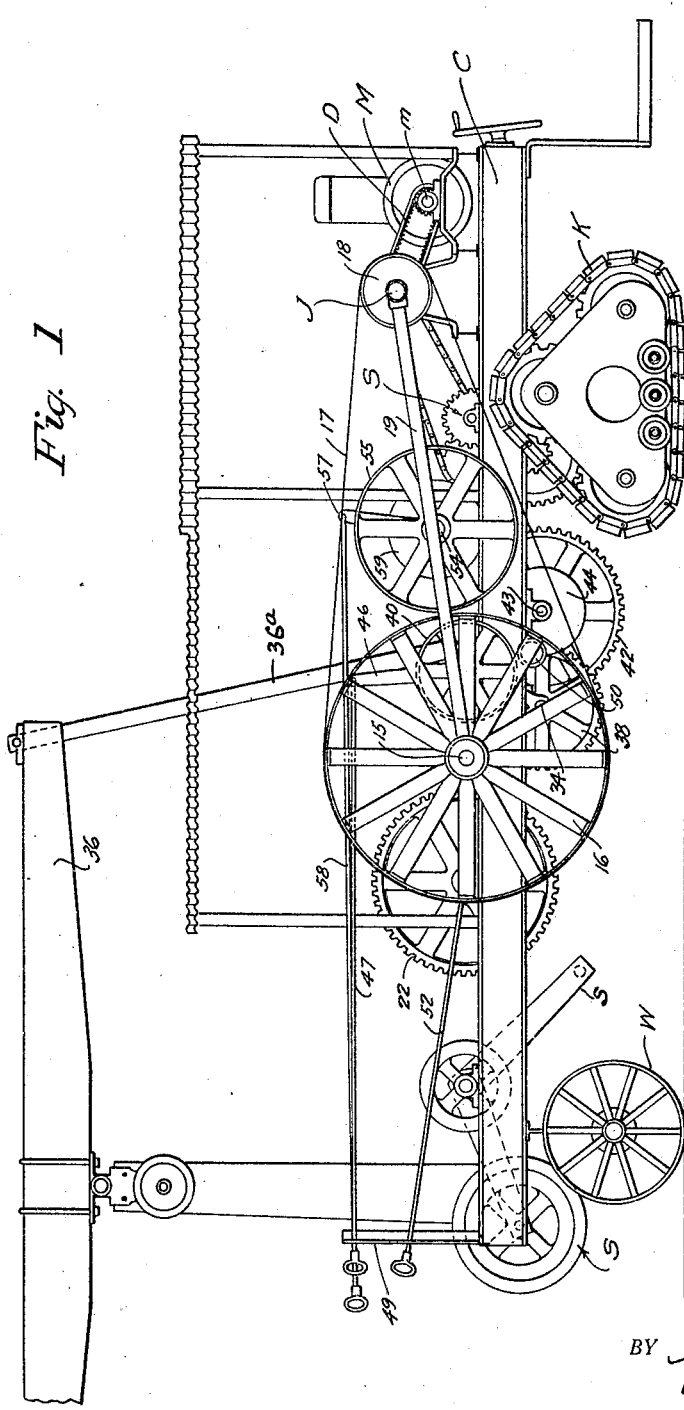
Figure 1 is a view showing in side elevation one form of power transmission mechanism incorporated in a portable well drilling apparatus.

Referring specifically to the drawing, and particularly to Figure 1, I have here shown a portable drilling apparatus comprising a chassis C supported for movement upon caterpillars K and wheels W, the caterpillars being driven by a motor M supported upon the chassis and operatively connected to the caterpillars through a jack shaft J driven from the motor shaft $m$ by a chain and sprocket connection D. The jack shaft J is operatively connected to a suitable selective type of transmission S so that the direction as well as the speed of the caterpillars can be readily controlled.

The power transmission mechanism forming the subject matter of my invention comprises a driven shaft 15 arranged transversely of the chassis and journaled in suitable bearings, such shaft having fixed to one end thereof a band wheel 16 arranged at one side of the chassis and about which is trained a belt 17 to provide an operative connection between the pulley 18 fixed to the jack shaft J and the band wheel. As clearly shown in Figure 3, the band wheel end of the shaft 15 projects from the latter and has connected thereto a brace pipe or rod 19 which extends rearwardly and is connected to the jack shaft J for bracing purposes, as will be understood. At one side of the shaft 15 is mounted a shaft 20 to which is fixed a bull wheel 21 arranged between the two sides of the chassis C. Fixed to one end of the shaft 20 is a gear wheel 22 adapted to be driven from the shaft 15 through a gear 23 mounted for sliding movement upon the shaft 15 to engage or disengage the gear wheel 22. The gear 23 is adapted to be operatively connected to the shaft 15 so as to be driven thereby by means of a clutch 24 which, as clearly shown in Figure 4, is of the internal expanding type, and is adapted to be operated from a remote point by means of a rod 25 extended to the forward end of the vehicle. The rod 25 is connected to a lever 26 and the latter in turn is connected to the clutch 24. A second lever 27 functions to move the gear 23 into or out of engagement with the gear wheel 22. The levers 26 and 27 are fulcrumed on a bracket 27ª suitably secured to the chassis C.

Below the shaft 15 is mounted an axle 28 upon which is rotatably mounted an idler pinion 29 movable by a rod 30 to engage or disengage the gear wheel 22. This idler pinion 29 is designed for the purpose of effecting reverse rotation of the gear wheel 22 and when in mesh with such gear wheel and the gear 23 out of mesh therewith, it will be clear that with the shaft 15 rotating the gear wheel will be driven in the reverse direction. It will be noted that the gear pinion 29 is sufficiently long to allow the necessary movement thereof in engaging and disengaging the gear wheel without unmeshing with the gear 23.

From the above description of the gear and clutch mechanism, it will be clear that the bull wheel 21 can be driven in either direction by the band wheel 16, and that the bull wheel may remain at rest independently of the band wheel and driven shaft. Upon the other end of the shaft 20 is a brake wheel 31 adapted to be engaged by a brake band 32 operated by a brake rod 33. This braking mechanism operates to check the rotation of the bull wheel when desired and to thus facilitate the pulling or lowering of tools by the bull wheel.

On the other side of the driven shaft 15 is mounted a shaft 34, which I term a crank shaft, as one end thereof is provided with a crank 35 which is operatively connected to a walking beam 36 (Figure 1) through a connecting rod 36ª so that upon rotation of the shaft the walking beam will be operated. This shaft 34 is rotated simultaneously with the rotation of the driven shaft 15 and is operatively connected thereto through the medium of gears 37 and 38 fixed to the shafts 15 and 34, respectively.

Above and at one side of the crank shaft 34 is a countershaft 39 having fixed thereto a friction wheel 40 and a gear 41, the latter constantly meshing with a gear wheel 42 fixed to a shaft 43 of a calf reel 44. The shaft 39 is adapted to be driven by the band wheel 16 and, as shown to advantage in Figure 6, the shaft 39 is journaled eccentrically in a bearing 45, the latter being rotatable by an arm 46 connected to an operating rod 47. As clearly shown in Figure 3, the friction wheel 40 is arranged to engage the inner surface of the rim of the band wheel 16, it being noted that the arrangement of the spokes of the band wheel is such as to accommodate the friction wheel. By virtue of the movable bearing 45, the shaft 39 can be shifted to cause the friction wheel 40 to engage or disengage the band wheel 16, and it will be understood that when in engagement with the band wheel the friction wheel is rotated to drive the shaft 39.

Through the adjustable bearing 45 the friction wheel 40 is capable of occupying one extreme position in which it engages the band wheel 16, another extreme position in which it engages a brake band 48, and a third or neutral position in which it is out of engagement with both the brake band and the band wheel. To maintain the friction wheel in any of these three positions, the operating rod 47 is engaged by a support 49 (Figure 1), with the rod 47 notched so that the support will hold the rod and consequently the arm 46 in any adjusted position.

Figure 2:
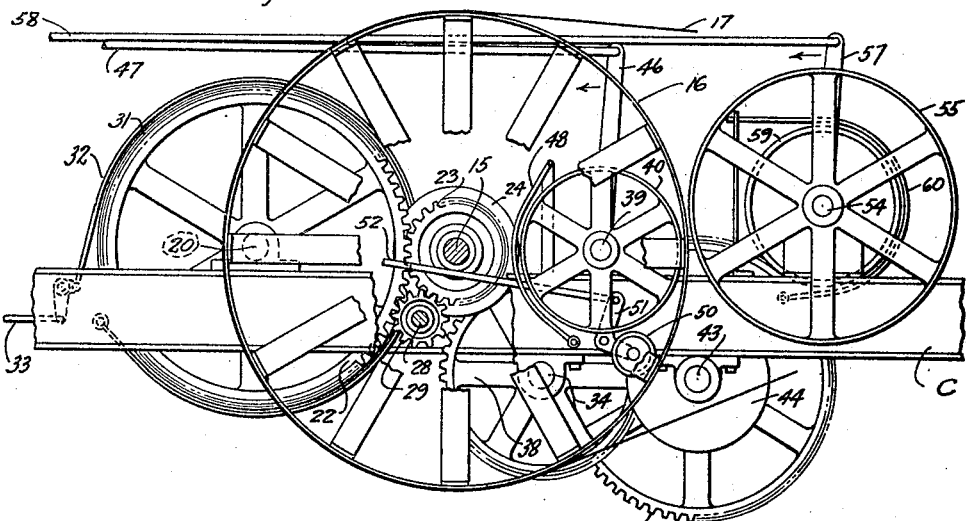
Figure 2 is an enlarged view showing in side elevation and partly in section the power transmission mechanism shown in Figure 1.

Rotation of the shaft 39 effects rotation of the calf reel 44 in one direction through the medium of the gears 41 and 42, and to effect reverse rotation of the calf wheel I have provided a small friction wheel 50 which, as clearly shown in Figure 2, is mounted upon a bell crank lever 51 so as to occupy an inactive position as shown, or an active position in which it engages the inner periphery of the band wheel 16 and the periphery of the friction wheel 40, thereby providing a driving connection between the two wheels and effecting rotation of the shaft 39 in the opposite direction. An operating rod 52 is connected to the bell crank lever 51 so that actuation of the friction wheel 50 can be effected from the forward end of the chassis.

At the rear of and above the calf reel 44 is a sand reel 53 fixed to a shaft 54 provided at one end with a friction wheel or pulley 55 adapted to engage the outer periphery of the band wheel 16. The shaft 54 is eccentrically mounted in an adjustable bearing 56, and this bearing, as shown in Figure 5, is adapted to be adjusted through the actuation of an arm 57 connected to an operating rod 58 which extends to the front of the chassis C, as clearly shown in Figure 1. Through the adjustable bearing 56 the shaft 54 is capable of occupying one extreme position in which the friction pulley 55 engages the band wheel 16 so as to be driven thereby, a neutral position in which the friction pulley is out of engagement with the band wheel, and another extreme position in which a brake pulley 59 fixed to the sand reel 53 enengages a brake band 60 so as to stop rotation of the sand reel, as will be understood.

By reference to Figures 5 and 6, it will be seen that in the normal positions of the shafts 39 and 54 the positions of the bearings 45 and 56 are reversed so that movement of the arms 46 and 57 forwardly, as indicated by the arrows in Figure 2, will cause the wheels 40 and 55 to move toward each other to engage the inner and outer peripheries of the band wheel 16. Conversely, movement of the arms 40 and 57 in the other direction shifts the wheels 40 and 55 out of engagement with the band wheel 16, and the wheels 40 and 59 into engagement with the brake bands 48 and 60. This control is of great advantage in the operation of the calf and sand reels.

In Figure 1 I have shown a conventional form of spudding mechanism, designated generally at S, and which is adapted to be actuated by the crank 35 by disconnecting the connecting rod 36ª from the walking beam 36 and connecting the same to arm s of the spudding mechanism thereto, as will be understood.

From the foregoing description, taken in conjunction with the accompanying drawings, it will be manifest that I have provided a power transmission mechanism which permits of the driving of the bull wheel, calf reel, sand reel and walking beam independently of each other and from a common driving means, namely, the band wheel 16, and that the driving of any one of these elements in either direction, with the exception of the walking beam, can be effected independently of the others while the band wheel constantly rotates in one direction. The simple and practical means for controlling the direction of rotation of the several elements and for bringing the same to a standstill greatly facilitates the operations necessary in the drilling of a well, and it will be seen that the mechanical design of the transmission is such as to render it fully capable of withstanding the rough usage to which they are usually subjected and the ready replacement of parts in the event they should become worn or broken.

I claim:

1. A power transmission for drilling apparatus comprising a driven shaft, a band wheel fixed thereto, a bull wheel including a brake wheel and a gear wheel, a gear movable on the driven shaft to engage or disengage the gear wheel, a clutch for operatively connecting the gear to the driven shaft, a second gear fixed to the driven shaft, a crank shaft, a gear wheel fixed to the crank shaft and constantly meshing with the fixed gear, a counter-shaft having a friction wheel adapted to contact with and to be driven by the inner surface of the rim of the band wheel, means for supporting the counter-shaft for lateral shifting to cause the friction wheel to engage or disengage the band wheel, a friction idler movable to engage the friction wheel and band wheel for driving the friction wheel in a reverse direction, a calf reel having a shaft provided with a gear wheel, a pinion fixed to the counter-shaft and constantly meshing with the gear wheel of the calf reel, a sand reel, and a friction wheel fixed to the sand reel and movable to engage or disengage the outer surface of the rim of the band wheel, a brake wheel fixed to the sand reel, and a brake adapted to engage the brake wheel.

2. A power transmission for drilling apparatus, comprising a driven shaft, a band wheel fixed thereto and about which a power-conveying belt is adapted to be trained, a bull wheel, a gear wheel fixed to the bull wheel, a gear movable on the driven shaft to engage or disengage the gear wheel, a clutch for operatively connecting the gear to the driven shaft, an idler shaft, and an idler pinion constantly meshing with the gear and movable on the shaft to engage or disengage the gear wheel.

3. A power transmission for drilling apparatus comprising a driven shaft, a band wheel fixed thereto, a counter-shaft, a friction wheel fixed to the counter-shaft and adapted to engage the inner periphery of the rim of the band wheel so as to be driven by the latter, means for supporting the counter-shaft to permit the friction wheel to engage or disengage the band wheel, and an idler movable to engage or disengage the friction wheel and band wheel whereby the friction wheel can be driven in a reverse direction.

4. A power transmission for drilling apparatus comprising a driven shaft, a band wheel fixed to the shaft, a counter-shaft, a friction wheel fixed to the counter-shaft, a brake for the friction wheel, a third shaft, a friction wheel fixed to the third shaft, a brake wheel fixed to the third shaft, a brake band for the brake wheel, and means for supporting the counter-shaft and the third shaft for lateral shifting movement in either direction to permit the first friction wheel to engage or disengage the band wheel and said brake, and to allow the second friction wheel to engage or disengage the band wheel and the brake wheel to engage or disengage the brake band.

JOHN W. MILLER.